United States Patent
Yu et al.

(10) Patent No.: US 11,554,618 B2
(45) Date of Patent: Jan. 17, 2023

(54) TIRE PRESSURE MONITORING SYSTEM FOR TRACTOR-TRAILER

(71) Applicant: CUB ELECPARTS INC., Changhua County (TW)

(72) Inventors: San-Chuan Yu, Changhua County (TW); Tzu-Wen Ko, Changhua County (TW); Tsan-Nung Wang, Changhua County (TW); Chi-Hung Chen, Changhua County (TW); Te-Chin Hsu, Changhua County (TW); Wei-Shun Shih, Changhua County (TW)

(73) Assignee: CUB ELECPARTS INC., Changhua County (TW)

( * ) Notice: Subject to any disclaimer, the term of this patent is extended or adjusted under 35 U.S.C. 154(b) by 409 days.

(21) Appl. No.: 16/802,047

(22) Filed: Feb. 26, 2020

(65) Prior Publication Data

US 2020/0324588 A1 Oct. 15, 2020

(30) Foreign Application Priority Data

Apr. 9, 2019 (TW) .................................. 108112361

(51) Int. Cl.
*B60C 23/04* (2006.01)
*B60C 23/00* (2006.01)

(52) U.S. Cl.
CPC ........ *B60C 23/0442* (2013.01); *B60C 23/009* (2013.01); *B60C 23/0474* (2013.01)

(58) Field of Classification Search
CPC .............. B60C 23/0442; B60C 23/009; B60C 23/0474; B60C 23/0401; B60C 23/0454;
(Continued)

(56) References Cited

U.S. PATENT DOCUMENTS

| | | | |
|---|---|---|---|
| 4,816,802 A | 3/1989 | Doerksen et al. | |
| 8,463,491 B2 * | 6/2013 | Weston | ............... B60C 23/0488 701/33.1 |

(Continued)

FOREIGN PATENT DOCUMENTS

| | | |
|---|---|---|
| CN | 103818203 A1 | 5/2014 |
| CN | 205523947 U | 8/2016 |

(Continued)

*Primary Examiner* — Eric Blount
(74) *Attorney, Agent, or Firm* — Muncy, Geissler, Olds & Lowe, P.C.

(57) ABSTRACT

A tire pressure monitoring system and tire pressure detector setting apparatus for tractor-trailer are disclosed. The tractor-trailer has a tractor and a trailer having a plurality of wheels, respectively. The tire pressure monitoring system includes a plurality of tire pressure detectors and a monitoring device. The tire pressure detectors are disposed on each of the wheels, detecting the tire pressure status of each wheel and generating a tire pressure information. Each tire pressure detector has a wheel code corresponding to one of the wheels, respectively. The monitoring device is disposed on the tractor for receiving the tire pressure information and the wheel codes of the corresponding tire pressure detector. When the tire pressure information and the wheel code are transmitted to the monitoring device, the monitoring device accurately monitors the tire pressure status of each wheel.

12 Claims, 6 Drawing Sheets

(58) Field of Classification Search
CPC .. B60C 23/007; B60C 23/008; B60C 23/0408
USPC ......................................................... 340/442
See application file for complete search history.

(56) References Cited

U.S. PATENT DOCUMENTS

| | | | |
|---|---|---|---|
| 8,576,059 B2 | 11/2013 | Rigney et al. | |
| 8,686,846 B2 | 4/2014 | Kanenari et al. | |
| 8,749,369 B2 | 6/2014 | Lee et al. | |
| 9,493,043 B2* | 11/2016 | Yu | B60C 23/0461 |
| 10,173,480 B2 | 1/2019 | Huang et al. | |
| 10,343,468 B2 | 7/2019 | Cyllik et al. | |
| 11,034,196 B2* | 6/2021 | Stewart | B60C 23/007 |
| 2002/0130771 A1* | 9/2002 | Osborne | B60C 23/008 |
| | | | 340/441 |
| 2005/0134446 A1 | 6/2005 | Stewart et al. | |
| 2007/0069877 A1* | 3/2007 | Fogelstrom | B60C 23/0408 |
| | | | 340/442 |
| 2007/0186634 A1* | 8/2007 | Burghardt | B60C 23/0408 |
| | | | 73/146 |
| 2008/0042817 A1 | 2/2008 | Fogelstrom | |
| 2009/0195373 A1* | 8/2009 | Lettieri | B60C 23/007 |
| | | | 340/447 |
| 2010/0191409 A1* | 7/2010 | Weston | B60C 23/0416 |
| | | | 701/29.6 |
| 2010/0283594 A1 | 11/2010 | Li | |
| 2011/0043342 A1* | 2/2011 | Shepler | B60C 23/009 |
| | | | 340/447 |
| 2011/0043343 A1* | 2/2011 | Shepler | B60C 23/0479 |
| | | | 73/146.2 |
| 2015/0057873 A1* | 2/2015 | Lammers | B60C 23/0488 |
| | | | 701/29.7 |
| 2016/0016444 A1* | 1/2016 | Lammers | B60T 7/12 |
| | | | 701/29.6 |
| 2016/0167446 A1 | 6/2016 | Xu et al. | |
| 2016/0200153 A1 | 7/2016 | Rothstein | |
| 2017/0368893 A1 | 12/2017 | Kodama et al. | |
| 2018/0257440 A1 | 9/2018 | Patel et al. | |

FOREIGN PATENT DOCUMENTS

| | | | |
|---|---|---|---|
| CN | 103818203 B | * | 3/2017 |
| DE | 102008032920 A1 | | 1/2010 |
| EP | 1946945 A1 | | 7/2008 |
| EP | 1946945 B1 | | 3/2012 |
| EP | 2891564 A1 | | 7/2015 |
| EP | 2949484 B1 | | 10/2016 |
| EP | 2949485 B1 | | 5/2017 |
| WO | WO-2010088807 A1 | | 8/2010 |
| WO | WO-2012069418 A1 | | 5/2012 |

* cited by examiner

TIRE PRESSURE MONITORING SYSTEM FOR TRACTOR-TRAILER

BACKGROUND OF THE INVENTION

1. Field of the Invention

The present invention relates to tire pressure detection areas, and more particularly, to a tire pressure monitoring system and tire pressure detector setting apparatus for tractor-trailer.

2. Description of the Related Art

A tire pressure detector is an electronic device disposed on a tire or wheel for detecting if the air pressure of the tire is sufficient. Such device notifies the driver of the tire pressure variation through an indicator panel, digital displayer, or simple lights and sounds, so as to reduce traffic accidents due to insufficient or excessive tire pressure.

A tire pressure detector is able to be installed not only on the tires of a sedan but also on a truck having a relatively larger scale, such as a tractor-trailer. Also, the tractor is allowed to drag different trailers. Referring to US2011/0043342A1, a tire status display system for a cargo trailer is disclosed. A display unit is provided in the driver room of the tractor. An antenna unit is disposed on the tractor and the trailer chassis, and a tire pressure monitoring system electronic control units (ECU) is disposed on the trailer chassis, and a sensor unit is disposed on each wheel. Therein, two antenna units receive the tire pressure information from each sensor unit, and transmit the tire pressure information received to the tire pressure monitoring system, respectively, and then the tire pressure monitoring system transmits the tire pressure information to the display unit, allowing the driver to observe the tire pressure status of each wheel.

In the aforementioned patent, the display unit disposed in the driver room has to be connected with the sensor unit of the tractor and the wheels of the trailer for detecting and receiving the tire pressure information of each wheels of the tractor and the trailer, respectively. For facilitating the transmission of the tire pressure information of the tractor and trailer wheels to the display unit, the tire pressure monitoring system is disposed on the chassis of the tractor, and the two antenna unit are disposed on the bottom portion of the trailer chassis. Therefore, the antenna units first transmit the tire pressure information of each wheel to the tire pressure monitoring system, and then the tire pressure monitoring system transmits the tire pressure information to the display unit.

However, when two or more trailers are being dragged by the tractor, three antenna units have to the disposed on the chassis of the trailer. In other words, when installing the tire pressure detection system of the patent above, at least two antenna units, one tire pressure monitoring system, and a plurality of sensor units are needed, causing a higher cost of the tire pressure detection system.

Also, because the antenna units have to receive the tire pressure information from each tire pressure detector and transmit the information to the tire pressure monitoring system, the antenna units need stable power supply for processing a massive amount of data. The aforementioned patent dose not disclose the power source of the antenna units, and ordinary power sources usually provide power through a battery or the tire pressure monitoring system. If the power source of the antenna units is in a form of a small-scale lithium cell, an ordinary small-scale lithium cell providing a voltage between 3 to 5 volts with a relatively small amount of electricity storage is unable to supply the power needed for the antenna units to process a massive amount of data in a long-term period. As a result, the battery has to be frequently replaced for maintaining the stable operation of the antenna units. If the power supply duration of the cell is to be increased, such device needs a large-scale lithium cell. As a result, the volume and weight of the antenna units are increased.

If the antenna units are powered through the tire pressure monitoring system, the tire pressure monitoring system has to be connected with the antenna units through a cable connection, so as to deliver the power from the tire pressure monitoring system to the antenna units. However, the trailer dragged by the tractor frequently changes. Therefore, when the trailer is changed, the cable connection between the tire pressure monitoring system and the antenna units need to be re-configured, failing to meet the convenience of usage.

SUMMARY OF THE INVENTION

For improving the issues above, a tire pressure monitoring system and tire pressure detector setting apparatus are provided. By setting the wheel code through each tire pressure detector, when the tire pressure detector transmits the tire pressure information corresponding to different wheel codes to the monitoring device, the tire pressure status of each wheel is clearly acquired according to the wheel codes. Therefore, a singular monitoring device is needed for completely and accurately acquire the tire pressure status of each wheel.

For achieving the aforementioned objectives, a tire pressure monitoring system for tractor-trailer is provided, the tractor-trailer having a tractor and a trailer, and the tractor and the trailer having a plurality of wheels, respectively, the tire pressure monitoring system comprises:

a plurality of tire pressure detectors, each of the tire pressure detectors being disposed on one of the wheels, respectively, such that each of the tire pressure detectors detects a tire pressure status of the corresponding wheel and accordingly generates a tire pressure information, wherein each tire pressure detector has an exclusive identification code and a wheel code, the wheel code of each tire pressure detector corresponding to a wheel position of the corresponding wheel, the tire pressure information and the wheel code are transmitted through a wireless transmission; and a monitoring device disposed on the tractor for receiving the tire pressure information and the wheel code of each tire pressure detector.

With such configuration, each tire pressure detector in the embodiment of the present invention is provided with a wheel code. When the tire pressure detector transmits the tire pressure information and the corresponding wheel code to the monitoring device, the monitoring device is allowed to acquire the tire pressure status of each tire of the corresponding wheel. Therefore, in the present invention, only a singular monitoring device is needed for completely and accurately monitor the tire pressure status of every wheel, so as to improve the inconvenience of the conventional system with a relatively higher cost due to the requirement of at least two antenna units, a tire pressure monitoring system, and a plurality of sensor units. Therefore, the cost of the tire pressure monitoring system is lowered.

Also, the monitoring device is only needed to be installed on the tractor, so that the trailers to be dragged by the tractor are allowed to freely exchanged or replaced without considering the issue of maintaining a stable power supply.

Therefore, the simple and efficient tire pressure status monitoring operation upon each wheels of the trailer is achieved.

In an embodiment of the present invention, each tire pressure detector has a wireless transmission module and a central processing module that are connected with each other. The central processing module control the wireless transmission module to periodically transmit the tire pressure information and the corresponding wheel code of each tire detector to the monitoring device according to a transmit cycle. Therein, each tire detector has a detection module. Each detection module is applied for determining the status of the tire. The central processing module is applied for adjusting the transmit cycle according to the determination of the detection module. Therefore, the transmit cycle of the wireless transmission module for transmitting the tire pressure information is adjusted according to the tire status, so as to prevent the unnecessary power waste of the tire pressure detector.

In an embodiment of the present invention, the monitoring device has a learning module and a plurality of field information, wherein each filed information corresponds to different wheels. Upon entering a learning status, the learning module receives the wheel code corresponding to the tire pressure detector which is determined as in a rolling status by the detection module, such that the wheel codes match with the field information. Therefore, the learning module is applied for confirming that the connected tire pressure detectors belong to an identical tractor-trailer, preventing the present invention from detecting the tire pressure information which belongs to other tractor-trailer, thus improving the accuracy of the tire pressure status monitoring process.

In an embodiment of the present invention, the wheel codes of the tire pressure detectors of the tractor wheels are selected from a first coding region, and the wheel codes of the tire pressure detectors of the trailer wheels are selected from a second coding region, wherein the first coding region and the second coding region do not overlap. Therein, the monitoring device has a plurality of filed information, and each field information corresponds to one of the wheels. Each field information comprises a wheel number, and each wheel number matches one of the wheel codes. Therefore, through the difference between the wheel code regions, the present invention efficiently and effectively determines that whether the wheel of the certain tire pressure detector belongs to the tractor or the trailer, so as to reduce the calculation time needed for the monitoring device to determine the wheel to which the certain tire pressure detector belongs.

In an embodiment of the present invention, a plurality of trailers are provided. One of the trailer has an assistance device, and the assistance device comprises an amplification module and a renewable energy power module. The renewable energy power module provides the power needed by the amplification module. The amplification module amplifies the signal of the wheel code and the tire pressure information from the tire pressure detector and then transmits the signal to the monitoring device. Therefore, by amplifying the transmission signal from the tire pressure detector at a farther distance through the assistance device, a stable transmission of the signal is assured, so as to prevent the accuracy from decreasing due to instable transmission of the signal.

A tire pressure detector setting apparatus is also provided, comprising:

a communication module coupled with the tire pressure detector; and a setting module having a plurality of tire pressure detection setting data and a plurality of wheel codes, the setting module applied for setting the tire pressure detector with one of the tire pressure detection setting data and one of the wheel codes through the communication module.

With such configuration, according to the wheel numbers of the tractor and the trailer, the wheel codes of the tire pressure detectors are set through the setting module for facilitating the subsequent tire pressure detection operation.

DETAILED DESCRIPTION OF THE INVENTION

The aforementioned and further advantages and features of the present invention will be understood by reference to the description of the preferred embodiment in conjunction with the accompanying drawings where the components are illustrated based on a proportion for explanation but not subject to the actual component proportion.

The terms "a", "an", and "the" presented in a singular form, unless clearly indicated to be otherwise in the context, also include the embodiment with plurality forms. In the specification, the terms "be provided", "include", and "comprise" indicate that the cited technical features, components, and/or assemblies are included without exclusions of one or more other technical features, components, assemblies, and/or units.

Further, when a first component is described to be "disposed on", "electrically connected with" or "coupled with" a second component, the embodiment includes that the first component is allowed to be directly disposed on, electrically connected with, or coupled with the second component, or that an intermediate component exists between the first and second components.

Figure 1:
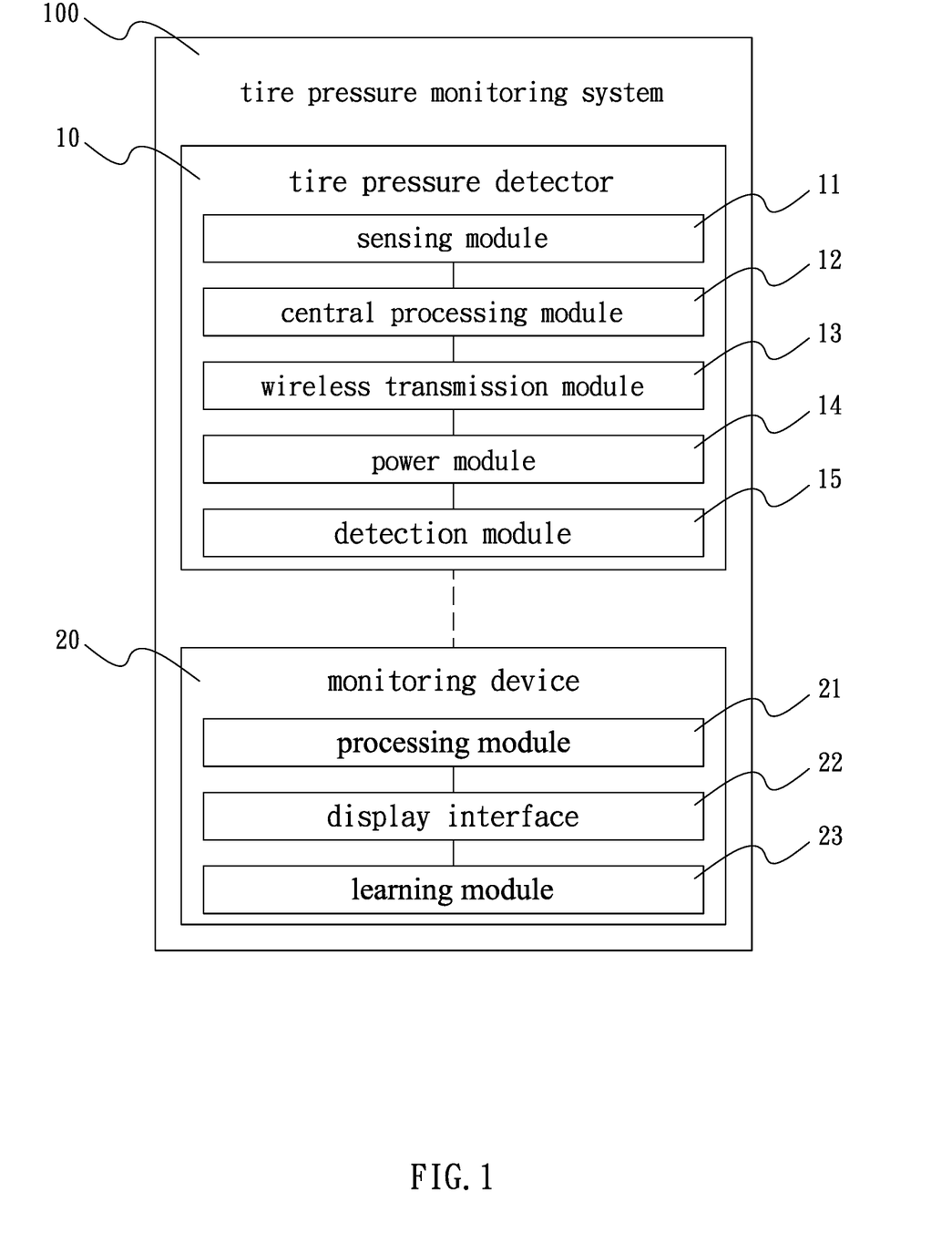
FIG. 1 is a structural block view of the tire pressure monitoring system in accordance with an embodiment of the present invention.
Figure 2:
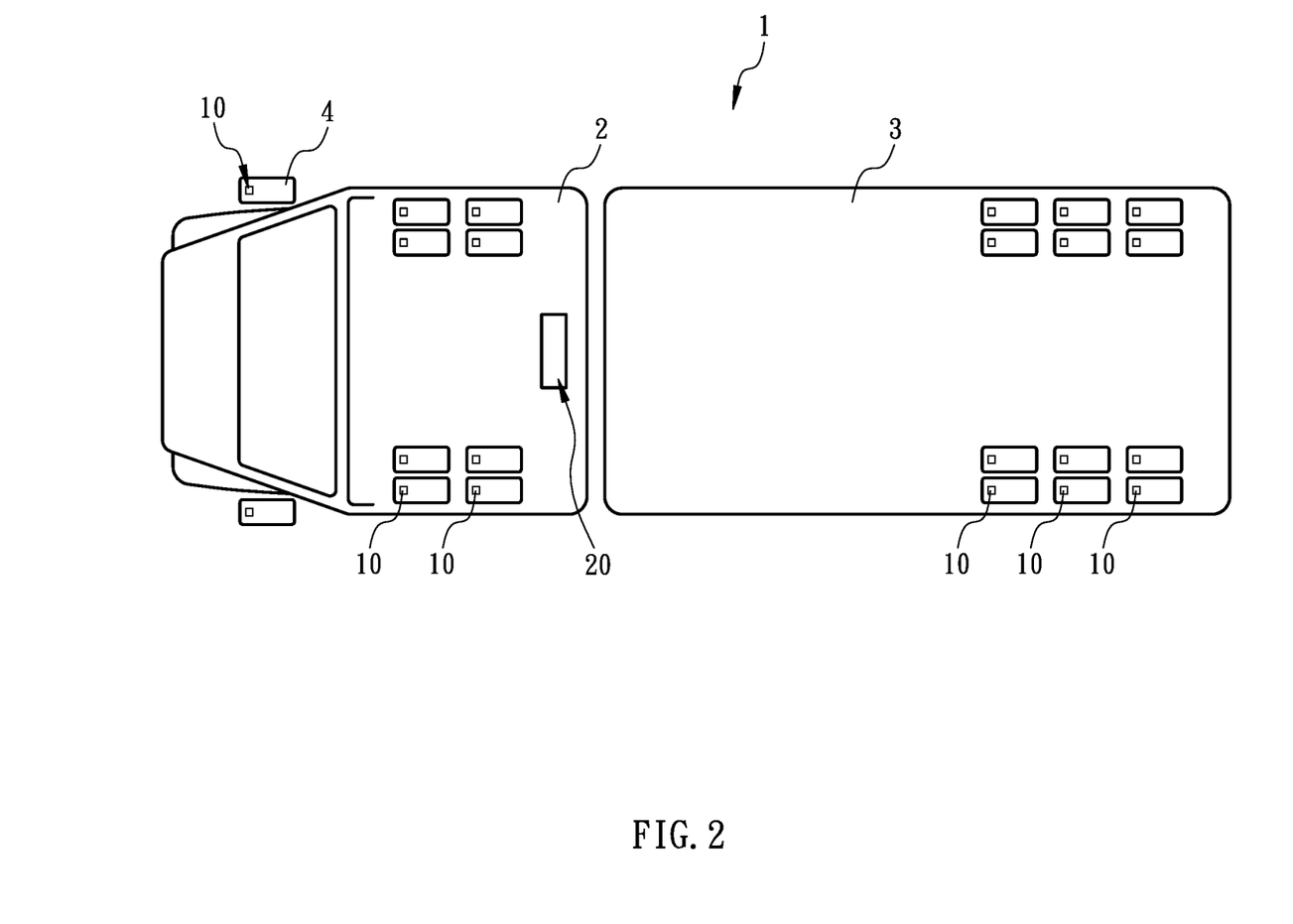
FIG. 2 is a schematic view illustrating the installation status of the tire pressure detectors and the monitoring device in accordance with an embodiment of the present invention.
Figure 3:
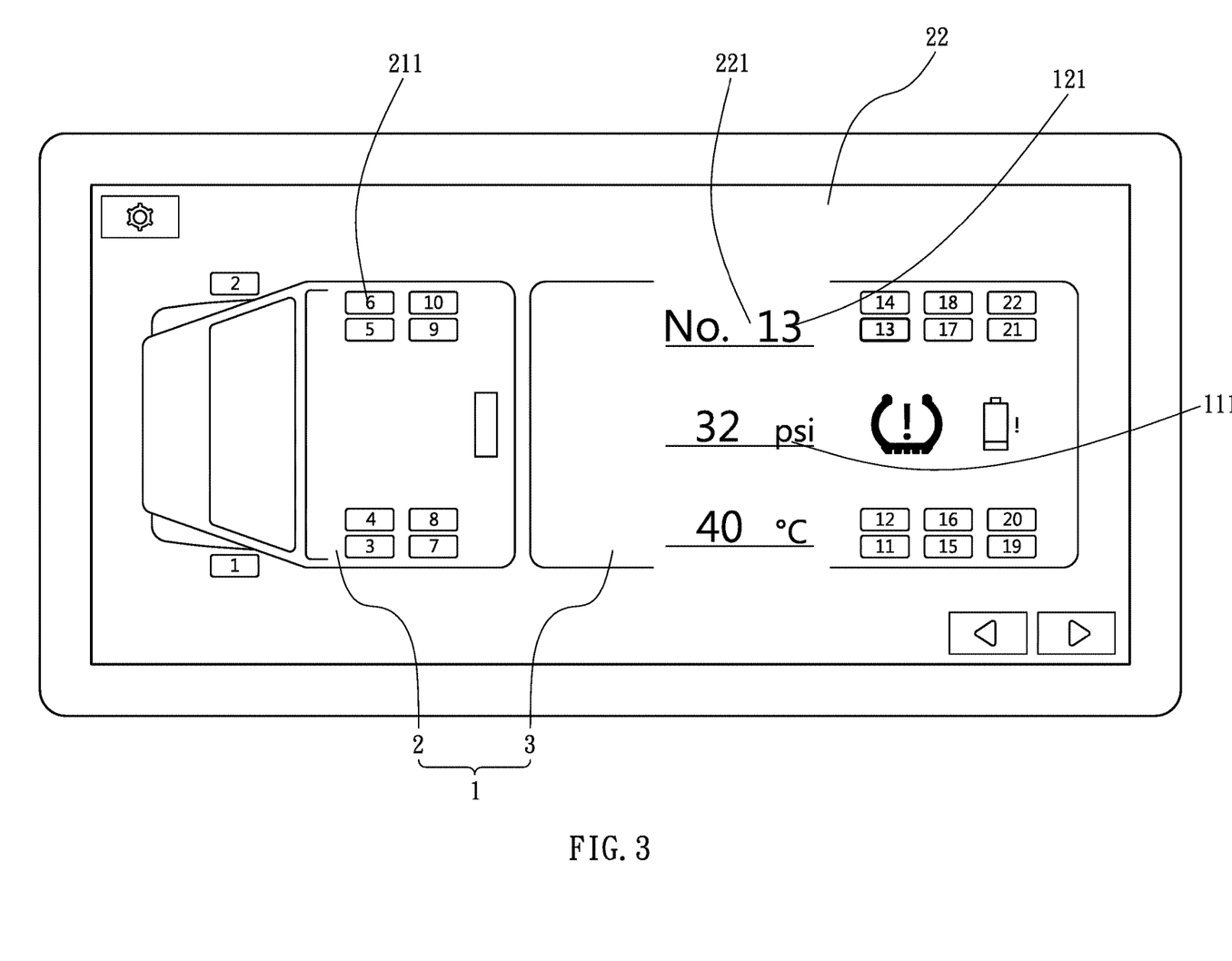
FIG. 3 is a schematic view illustrating the operation status of the monitoring device receiving the information transmitted by the tire pressure detector.

Referring to FIG. 1 to FIG. 3, a tire pressure monitoring system 100 for tractor-trailer in accordance with an embodiment of the present invention is provided. The tractor-trailer 1 comprises a tractor 2 and a trailer 3. The tractor 2 and the trailer 3 have a plurality of wheels 4. In an embodiment of the present invention, a plurality of trailers 3 are provided.

The tire pressure monitoring system 100 comprises a plurality of tire pressure detectors 10 and a monitoring device 20. The tire pressure detectors 10 are disposed on the wheels 4 of the tractor 2 and the trailer 3, respectively. The monitoring device 20 is disposed on the tractor 2. Therein, each tire pressure detector 10 is wirelessly connected with the monitoring device 20, such that the monitoring device 20 receives the information transmitted by the tire pressure detector 10.

Each tire pressure detector 10 has a sensing module 11, a central processing module 12, a wireless transmission module 13, and a power module 14 for supplying the power. Each tire pressure detector 10 is wirelessly connected with the monitoring device 20 through the wireless transmission module 13. The sensing module 11 of each tire pressure detector 10 is applied for detecting the tire pressure status of the wheel 4 to which the tire pressures detector 10 belongs, so as to generate a tire pressure information 111. The sensing module 11 transmits the detected tire pressure information 111 to the central processing module 12, and then the central processing module 12 periodically transmits the tire pressure information 111 to the monitoring device 20 through the wireless transmission module 13 according to a transmit cycle. The transmit cycle herein indicates the time interval between each time the tire pressure detector 10 transmits the signal to the monitoring device 20. A shorter time interval refers to a shorter transmit cycle, such that the monitoring device 20 more frequently receives the tire pressure information 111 and the wheel code 121 in a given unit of time.

Each tire pressure detector 10 has an exclusive identification code and a wheel code 121, wherein the identification code of each tire pressure detector 10 is the commodity serial number set exclusively for the tire pressure detector 10 in the manufacturing process. The wheel code 121 of each tire pressure detector 10 corresponds to different positions of the wheels 4, respectively. Therein, the wheel codes 121 of the tire pressure detectors 10 of the wheels 4 of the tractor 2 are selected from a first coding region, and the wheel codes 121 of the tire pressure detectors 10 of the wheels 4 of the trailer 3 are selected from a second coding region, wherein the first coding region and the second coding region do not overlap. For example, the first coding region is from 1 to 10, and the second coding region is from 11 to 20, as shown by FIG. 2.

In an embodiment of the present invention, the sensing module 11, the central processing module 12, and the wireless transmission module 13 are integrated. The wireless transmission module 13 is allowed to be a Bluetooth or RF antenna. Therein, the RF antenna is able to be a sub-1 GHz antenna; in other words, the RF antenna has a frequency lower than 1 GHz, such as at a frequency of 315 MHz, 434 MHz, 868 MHz, or 915 MHz. The power module 14 is a battery.

Further, each tire pressure detector 10 has a detection module 15 for determining the status of the wheel 4. The central processing module 12 adjusts the transmit cycle of the wireless transmission module 13 according to the determination of the detection module 15. Therein, the detection module 15 is allowed to be selected from a group consisting of, for example but not limited to, an accelerometer, g-sensor, or gyroscope.

It is noted that each detection module 15 determines if the wheel 4 is in a rolling, static, or stable status. Therein, the rolling status indicates that the tractor 2 of the tractor-trailer 1 drags the trailer 3 to move. The static status indicates that the tractor-trailer 1 is not moving, or a certain wheel 4 of the trailer 3 is lifted and not contacting the ground surface. The stable status indicates that the tractor 2 of the tractor-trailer 1 dragging the trailer 3 are not in a completely static status; in other words, either they have been moving for a period of time, such as on a high-way, or they continuously change between a moving status and a halting status, such as being halted due to a red light and starting to move again. Such statuses of the tractor-trailer 1 during movement is defined as the "stable status".

The transmit cycle of the wireless transmission module 13 controlled by the central processing module 12 includes a first transmit cycle, a second transmit cycle, and a third transmit cycle, wherein the first transmit cycle is shorter than the second and the third transmit cycles, and the second transmit cycle is longer than the third transmit cycle.

When the wheel 4 to which the tire pressure detector 10 belongs is in the rolling status, the central processing module 12 controls the wireless transmission module 13 to periodically transmit the tire pressure information 111 and the wheel code 121 of the tire pressure detector 10 to the monitoring device 20 according to the first transmit cycle. When the wheel 4 to which the tire pressure detector 10 belongs is in the static status, the central processing module 12 controls the wireless transmission module 13 to periodically transmit the tire pressure information 111 and the wheel code 121 of the tire pressure detector 10 to the monitoring device 20 according to the second transmit cycle. When the wheel 4 to which the tire pressure detector 10 belongs is in the stable status, the central processing module 12 controls the wireless transmission module 13 to periodically transmit the tire pressure information 111 and the wheel code 121 of the tire pressure detector 10 to the monitoring device 20 according to the third transmit cycle.

In other words, when the wheel 4 to which the tire pressure detector 10 belongs is in the rolling status, it indicates that the tractor-trailer 1 just starts moving and is in need of closely observing the connection and operation status of the wheels 4. Therefore, each tire pressure detector 10 has to frequently transmits the tire pressure information 111 to the monitoring device 20 according to the first transmit cycle, so as to assure the continuity and stability of the data transmission, thus preventing the driving safety from begin affected by any data transmission omission. When the wheel 4 to which the tire pressure detector 10 belongs is in the static status, it indicates that the tractor-trailer 1 has stop moving, or a certain wheel 4 of the trailer 3 is lifted and not contacting the ground surface. Therefore, the tire pressure information 111 is periodically transmitted to the monitoring device 20 according to the second transmit cycle which is relatively longer than the first transmit cycle, so as to maintain the monitoring process and save unnecessary power waste of the power module 14. When the tractor-trailer 1 has stable moving for a period of time, the wireless connection between the wheels 4 and the monitoring device 20 are stably established, and the detection module 15 determines that the wheels 4 are in the stable status. Therefore, the tire pressure information 111 is periodically transmitted to the monitoring device 20 according to the third transmit cycle which is a more appropriate choice. Without frequently transmitting the tire pressure information 111, the continuity and stability of the data transmission are still assured.

The monitoring device 20 has a processing module 21 which is connected with wireless transmission module 13 of the tire pressure detectors 10 in a wireless connection manner, so as to receive the tire pressure information 111 and the wheel code 121 of each tire pressure detector 10. The monitoring device 20 has a display interface 22, which has a plurality of virtual fields 221. Each of the virtual fields 221 corresponds to the position of each wheel 4 on the tractor 2 or the trailer 3. The processing module 21 includes a plurality of field information and a threshold value. Each field information corresponds to a different wheel 4, and each field information has a wheel number 211. Each virtual field 221 displays the wheel number 211 of the corresponding field information, such that each wheel number 211 is applied for matching the corresponding wheel code 121. The threshold value is applied for confirming if the wheel code 121 of the tire pressure detector 10 is successfully matched. Therein, the threshold value is the times of the processing module 21 receiving the wheel code 121, the identification code, and the tire pressure information 111 of the tire pressure detector 10 in a fixed time duration unit. In an embodiment of the present invention, the threshold is defined as that the processing module 21 receives the wheel codes 121 and the tire pressure information 111 of the tire pressure detector 10 for five times in one minute. However, such threshold value does not limit the features of the present invention.

It is noted that, when the processing module 21 receives the wheel code 121 transmitted from the wireless transmission module 13 of the tire pressure detectors 10, the processing module 21 matches each wheel code 121 and the corresponding wheel number 211. Also, the processing module 21 continuously counts the amount of times of receiving the wheel codes 121, the identification codes, and the tire pressure information 111 transmitted by each tire pressure detector 10. When the transmission times reach the threshold value, it indicates that the signal transmission becomes stable, and the wheel codes 121 of the tire pressure detectors 10 are successfully matched with the corresponding wheel numbers 211, respectively. After the matching process, each virtual field 221 displays the wheel code 121 and the tire pressure information 111 of the tire pressure detectors 10 corresponding to the wheels 4 that are in different statuses, such as rolling status or stable status, as shown by FIG. 2 and FIG. 3.

The monitoring device 20 further comprises a learning module 23. When the learning module 23 enters a learning status, the learning module 23 receives the wheel code 121 of the tire pressure detectors 10 corresponding to the wheel 4 which is determined by the detection module 15 as in the rolling status, such that the wheel code 121 is matched with the corresponding wheel number 211 in the field information.

It is noted that, when the tractor-trail 1 is active, the tractor 2 provides the power to the monitoring device 20. For matching the tire pressure detectors 10 of the wheels on the tractor 2 and the trailer 3 with the monitoring device 20, the learning module 23 is allowed to be activated by the user or automatically activated by the monitoring device 20. When the learning module 23 enters the learning status, the learning module 23 receives the wheel code 121 of the tire pressure detectors 10 corresponding to the wheel 4 which is determined by the detection module 15 as in the rolling status, and the learning module 23 transmits the received wheel code 121 and the identification code to the processing module 21, such that the processing module 21 matches the wheel code 121 and the identification code with the wheel number 211 of the field information. Also, the processing module 21 continuously counts the amount of times of receiving the wheel codes 121, the identification codes, and the tire pressure information 111 transmitted by each tire pressure detector 10. When the transmission times reach the threshold value, it indicates that the wheel code 121 of the tire pressure detector 10 is successfully matched with the corresponding wheel number 211. After the matching process, the wheel code 121 of the tire pressure detector 10 is combined with the virtual field 221 of the display interface 22, such that the virtual field 221 displays the wheel code 121 and the tire pressure information 111 of the corresponding tire pressure detector 10.

Notably, when the learning module 23 finishes matching all the rolling pressure detectors 10, the learning mode will be finished. Alternatively, the learning module 23 is allowed to be configured to finish the learning mode according to the current matching status after the learning mode is activated for a certain period of time (predetermined or set by the user). In other words, the learning mode does not have to be finished after all the wheels 4 of the tractor-trailer 1 are completed being matched. The reason lies in that some wheels 4 may sometimes be lifted up according to specific operation status, so that those wheels 4 will not contact the ground surface; therefore, the tire pressure detection operation is not needed on those wheels 4.

Further, under the same environment, when a plurality of tractor-trailers 1 are provided, through the learning module 23, the monitoring device 20 of each tractor-trailer 1 is able to assure that the tire pressure information 111 received by the monitoring device 20 of the tractor-trailer 1 come from the tire pressure detectors 10 that are disposed on the wheels 4 of the same tractor-trailer 1, and each tire pressure detector 10 which is successfully matched is tied to the corresponding virtual field 221. After all the tire pressure detector 10 of the wheels 4 in the rolling status being successfully matched, the learning module 23 stops the learning mode. Therefore, the tire pressure information 111 subsequently received and displayed will surely come from the tire pressure detectors 10 disposed on the same tractor-trailer 1, thus preventing the monitoring device 20 from receiving the tire pressure information 111 transmitted by the tire pressure detectors 10 disposed on different tractor-trailers 1.

Figure 4:
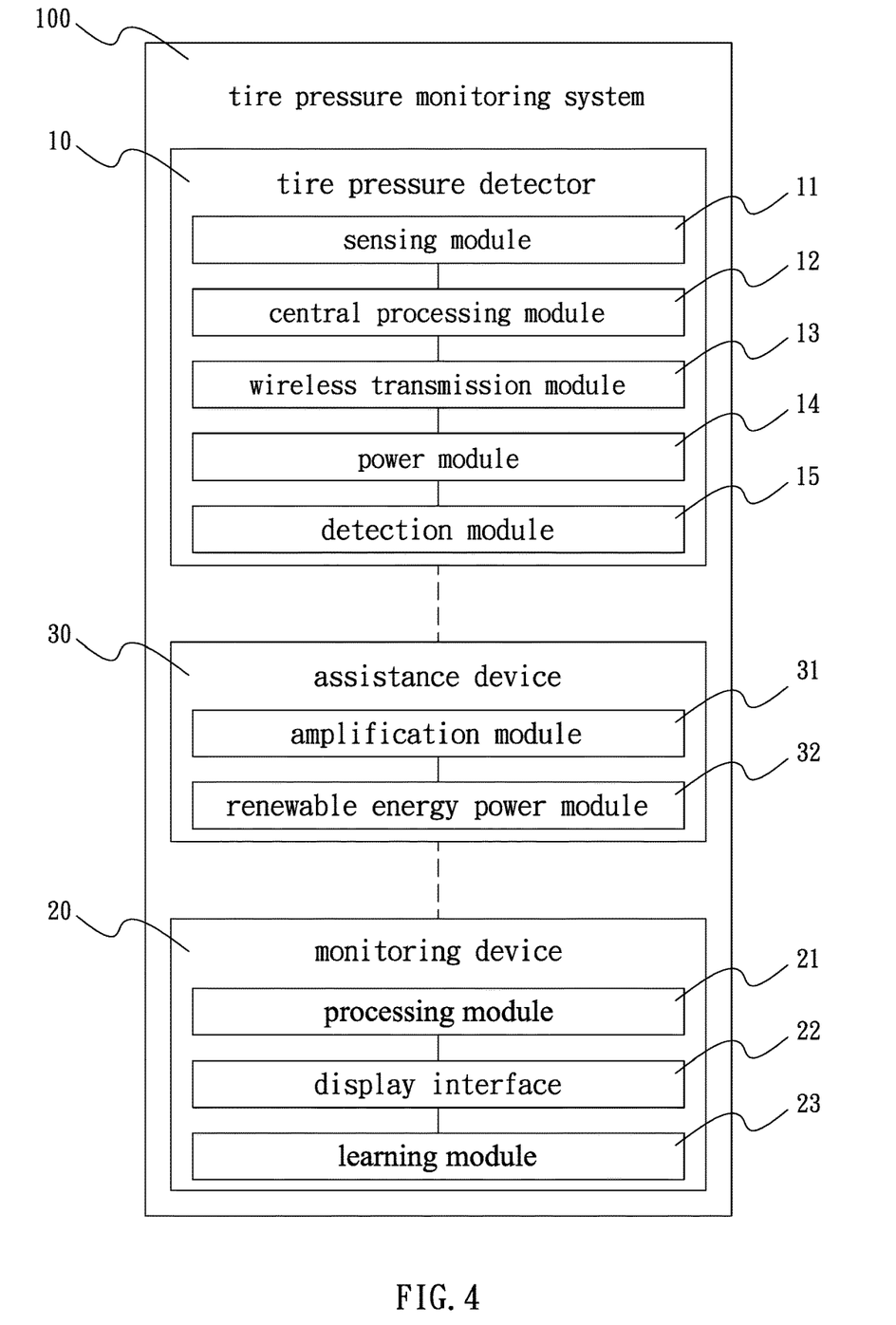
FIG. 4 is a structural block view of the tire monitoring system in accordance with another embodiment of the present invention.
Figure 5:
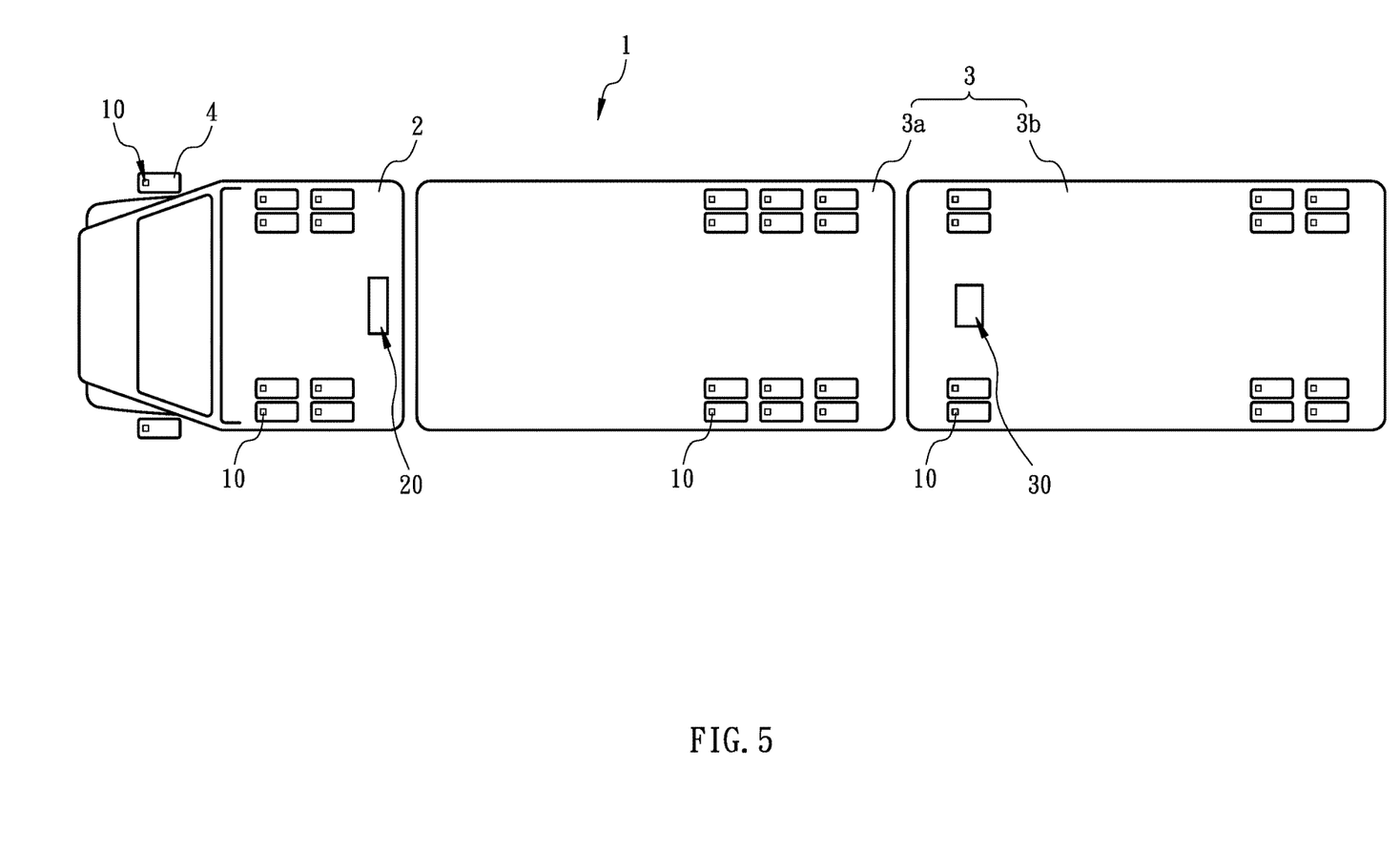
FIG. 5 is a schematic view illustrating the installation status of the tire pressure detector, the monitoring device, and the assistance device in accordance with another embodiment of the present invention.

Referring to FIG. 4 and FIG. 5, in another embodiment of the present invention, the tire pressure monitoring system 100 further comprises an assistance device 30.

The assistance device 30 is wirelessly connected with the monitoring device 20 and is disposed on the trailer 3. In the embodiment, when the one track-trailer 1 drags a plurality of trailers 3, one of the trailers 3 is provided with the assistance device 30. Referring to FIG. 5, when two trailers 3 are involved, namely the first trailer 3a and the second trailer 3b, the first trailer 3a is disposed between the tractor 2 and the second trailer 3b, and the assistance device 30 is disposed on the chassis of the second trailer 3b.

The assistance device 30 comprises an amplification module 31 and a renewable energy power module 32 providing the power needed by the amplification module 31. The amplification module 31 amplifies the signals of the wheel code 121, the identification code, and the tire pressure information 111 and then transmits such signals to the monitoring device 20.

In an embodiment of the present invention, the renewable energy power module 32 is a wind power generation module. Therefore, the assistance device 30 is able to acquire the wind power generated during the movement of the tractor-trailer 1 through the renewable energy power module 32 without the need of periodically replacing the batteries, and the amplification module 31 stably amplifies the signals from each tire pressure detector 10.

In other words, the distance between the second trailer 3b and the monitoring device 20 is longer. Without increasing the transmission power of the wireless transmission module 13, the signals of the wheel codes 121, the identification codes, and the tire pressure information 111 need to be amplified by the assistance device 30, such that the monitoring device 20 is allowed to stably receive the wheel codes 121, the identification codes, and the tire pressure information 111 generated by the tire pressure detector 10 of each wheel 4 of the second trailer 3b.

Figure 6:
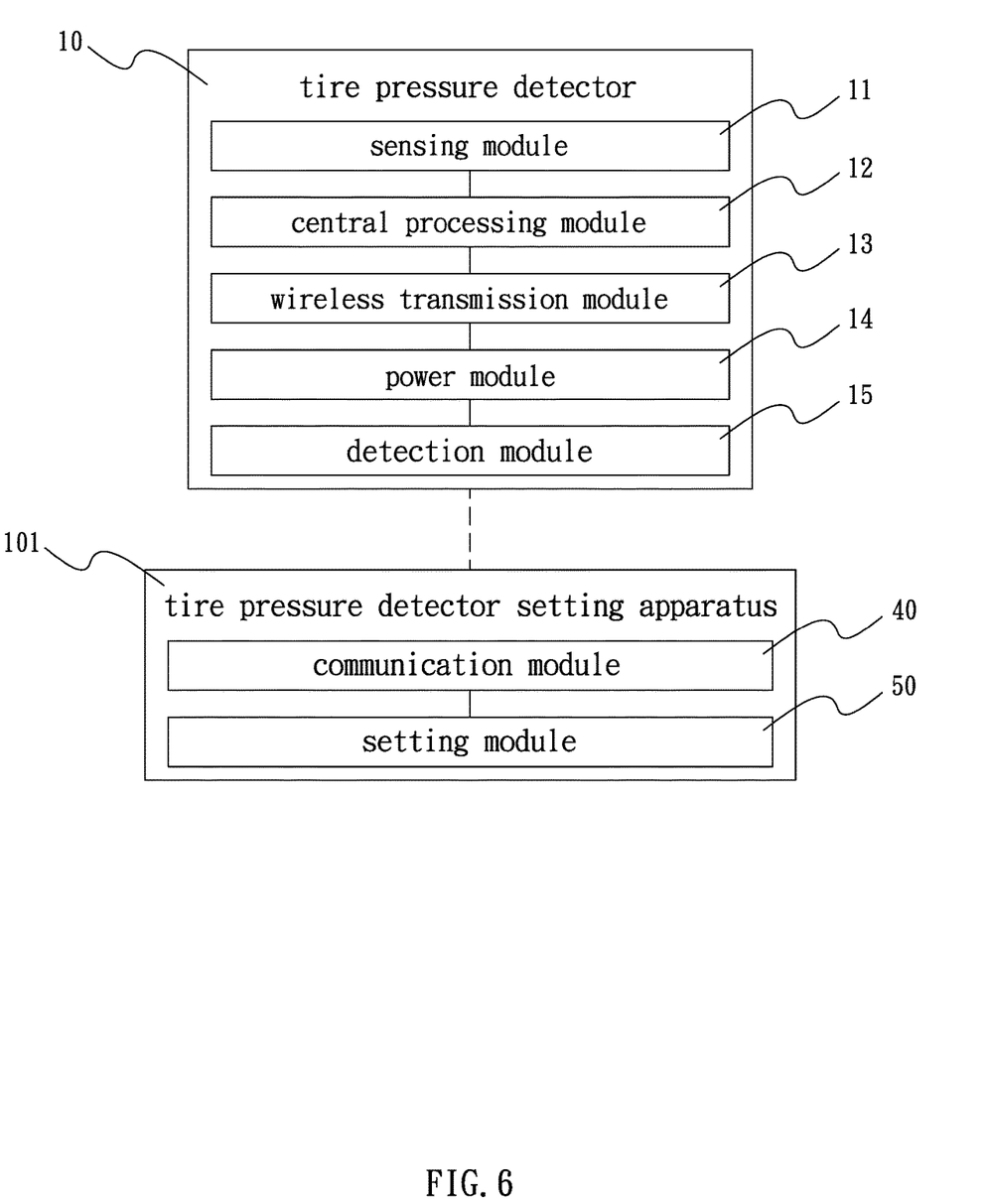
FIG. 6 is a structural block view of the tire pressure detector setting apparatus in accordance with an embodiment of the present invention.

Referring to FIG. 6, a tire pressure detector setting apparatus 101 is provided, comprising a communication module 40 and a setting module 50.

The communication module 40 is coupled with the tire pressure detector 10.

The setting module 50 is coupled with the communication module 40. The setting module 50 has a plurality of tire pressure detection setting data, identification codes, and wheel codes 121. The setting module 50 is applied for setting one of the tire pressure detection setting data, one of the identification codes, and one of the wheel codes 121 to the tire pressure detector 10 through the communication module 40. Therein, the tire pressure detection setting data includes the communication protocol, brand name of the corresponding vehicle, the communication protocol of the vehicle or the corresponding brand, the size of the wheels 4 of the brand, and the model of the wheels 4.

Therefore, besides that the tire pressure detector 10 has the pre-set wheel codes 121 when leaving the factory, the wheel codes 121 are also able to be set in the tire pressure detector 10 according to the positions of the wheels 4 through the setting module 50 of the tire pressure detector setting apparatus 101. When the monitoring device 20 receives the wheel codes 121 from the tire pressure detector 10, the monitoring device 20 is able to identify that which is the correct wheel 4 having the tire pressure detector 10 transmitting the data.

With the foregoing configuration, advantages of the present invention will be illustrated below.

The present invention set the wheel codes 121 in each of the tire pressure detector 10. When the tire pressure detector 10 transmits the tire pressure information 111 together with the wheel code 121 and the identification code to the monitoring device 20, the monitoring device 20 is allowed to acquire the tire pressure status of each wheel 4 through the wheel codes 121 and the identification code. Therefore, only one monitoring device 20 is needed for completely and accurately monitoring the tire pressure status of each wheel 4, thus effectively lower the cost of the tire pressure monitoring system 100 of the present invention.

The monitoring device 20 is only disposed on the tractor 2, so that the trailers 3 dragged by the tractor 2 are allowed to freely changed without considering the stable power supply, thus achieving the simple and effective tire pressure status detection on the wheels 4 of the trailer 3.

The present invention is able to adjust the transmit cycle of the wireless transmission module 13 for transmitting the tire pressure information 111 according to the status of the wheels 4, so as to prevent unnecessary power waste of the tire pressure detector 10 when the wheels 4 are in the static or stable status, thus increasing the service life of the power module 14.

The present invention is able to assure that the tire pressure detectors 10 in communication with the monitoring device 20 are disposed on the same tractor-trailer 1 by use of the learning module 23, so as to prevent the monitoring device 20 from receiving the tire pressure statuses coming from different tractor-trailers 1, thus improving the accuracy of the tire pressure status monitoring operation.

With the application of the coding regions of the wheel codes 121, the monitoring device 20 is allowed to efficiently and accurately identify if the tire pressure detector 10 is disposed on the wheel 4 of the tractor 2 or the trailer 3, so as to lower the calculation time needed for the monitoring device 20 to identify the wheel 4 to which each of the tire pressure detector 10 belongs.

The present invention amplifies the signal transmitted from the tire pressure detector 10 that is disposed at a farther distance by use of the assistance device 30, so as to maintain the stable signal transmission and improve the monitoring accuracy.

According to the amounts and the positions of the wheels 4 disposed on the tractor 2 and the trailer 3, the setting module 50 of the tire pressure detector setting apparatus 101 is applied for setting the wheel codes 121 in the tire pressure detector 10, so as to prevent the tire pressure detector 10 from being limited to specific wheel 4 position.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A tire pressure monitoring system for a tractor-trailer, the tractor-trailer comprises a tractor and a trailer, the tractor and the trailer having a plurality of wheels, the tire pressure monitoring system comprising:
a plurality of tire pressure detectors disposed on each of the wheels, respectively, each of the tire pressure detectors detecting a tire pressure status of the corresponding wheel and accordingly generating a tire pressure information, each of the tire pressure detector having an identification code and a wheel code, the wheel code of each of the tire pressure detectors indicating a position of the corresponding wheel, the tire pressure information and the wheel code being transmitted through a wireless transmission, wherein each tire pressure detector determines the corresponding wheel as in a rolling status, a static status, or a stable status; in the rolling status, the tire pressure detector transmits the tire pressure information and the wheel code according to a first transmit cycle; in the static status, the tire pressure detector transmits the tire pressure information and the wheel code according to a second transmit cycle; in the stable status, the tire pressure detector transmits the tire pressure information and the wheel code according to a third transmit cycle; and
a monitoring device disposed on the tractor and receiving the tire pressure information and the wheel codes.

2. The tire pressure monitoring system of claim 1, wherein each of the tire pressure detectors has a wireless transmission module and a central processing module, the wireless transmission module and the monitoring device being wirelessly connected, the central processing module controlling the wireless transmission module according to the status of the wheel to transmit the tire pressure information and the wheel code of the corresponding tire pressure detector to the monitoring device according to the first transmit cycle, the second transmit cycle or the third transmit cycle.

3. The tire pressure monitoring system of claim 2, wherein each of the tire pressure detector has a detection module for determining a status of the corresponding wheel, and the central processing module adjusts the transmit cycle according to a determination of the detection module.

4. The tire pressure monitoring system of claim 1, wherein the first transmit cycle is shorter than the second transmit cycle and the third transmit cycle, and the second transmit cycle is longer than the third transmit cycle.

5. The tire pressure monitoring system of claim 1, wherein the monitoring device has a learning module and a plurality of field information, and each field information corresponds to one of the wheels; when the learning module enters a learning status, the learning module receives the wheel code of the tire pressure detectors corresponding to the wheel which is determined by the detection module as in the rolling status, such that the wheel code is matched with the corresponding field information.

6. The tire pressure monitoring system of claim 1, wherein the monitoring device has a display interface, and the display interface has a plurality of virtual fields, each of the virtual fields corresponds to the position of one of the wheels on the tractor or and trailer, each virtual field displaying the wheel code and the tire pressure information of the tire pressure detector corresponding to the wheel which is in the rolling status or the stable status.

7. The tire pressure monitoring system of claim 1, wherein the wheel codes of the tire pressure detectors of wheels on the tractor are selected from a first coding region, and the wheel codes of the tire pressure detectors of the wheels on the trailer are selected from a second coding region, and the first coding region and the second coding region do not overlap.

8. The tire pressure monitoring system of claim 7, wherein the monitoring device has a plurality of field information, each of the field information corresponding to one of the wheels, each of the field information having a wheel number which is applied for matching the corresponding wheel code.

9. The tire pressure monitoring system of claim 8, wherein the monitoring device has a threshold value which is applied for confirming if the wheel code of the tire pressure detectors is successfully matched with the corresponding wheel numbers.

10. The tire pressure monitoring system of claim 1, wherein a plurality of trailers are provided, and an assistance device is disposed on one of the trailers, the assistance device having an amplification module and a renewable energy power module, the renewable energy power module providing a power needed by the amplification module; the amplification module amplifies signals of the wheel codes and the tire pressure information and transmits the signals to the monitoring device.

11. The tire pressure monitoring system of claim 10, wherein the renewable energy power module is a wind power generation module.

12. The tire pressure monitoring system of claim 11, wherein the renewable energy power module is disposed on a chassis of the trailer.

* * * * *